(12) United States Patent
Kuenzi

(10) Patent No.: US 11,337,136 B2
(45) Date of Patent: May 17, 2022

(54) AUTOMATIC ROUTING IN A MESH NETWORK OF WIRELESS MESSAGING DEVICES

(71) Applicant: Carrier Corporation, Palm Beach Gardens, FL (US)

(72) Inventor: Adam Kuenzi, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 36 days.

(21) Appl. No.: 17/048,193

(22) PCT Filed: Apr. 23, 2019

(86) PCT No.: PCT/US2019/028757
§ 371 (c)(1),
(2) Date: Oct. 16, 2020

(87) PCT Pub. No.: WO2019/209851
PCT Pub. Date: Oct. 31, 2019

(65) Prior Publication Data
US 2021/0084566 A1 Mar. 18, 2021

Related U.S. Application Data

(60) Provisional application No. 62/682,552, filed on Jun. 8, 2018, provisional application No. 62/661,856, filed on Apr. 24, 2018.

(51) Int. Cl.
*H04W 40/24* (2009.01)
*H04W 84/18* (2009.01)

(52) U.S. Cl.
CPC .......... *H04W 40/248* (2013.01); *H04W 84/18* (2013.01)

(58) Field of Classification Search
None
See application file for complete search history.

(56) References Cited

U.S. PATENT DOCUMENTS

| 7,382,734 B2 | 6/2008 | Wakumoto et al. |
| 7,447,222 B2 | 11/2008 | Wakumoto et al. |

(Continued)

FOREIGN PATENT DOCUMENTS

| CN | 101047638 A | 10/2007 |
| CN | 104684041 A | 6/2015 |

(Continued)

OTHER PUBLICATIONS

International Search Report and Written Opinion for PCT Patent Application No. PCT/US2019/028757, dated Jul. 23, 2019.

(Continued)

*Primary Examiner* — Brian S Roberts
(74) *Attorney, Agent, or Firm* — Locke Lord LLP; Scott D. Wofsy; Judy R. Naamat

(57) ABSTRACT

A method of routing communication between nodes of at least one network including a mesh network is provided. The method includes each node of the mesh network advertising a hop distance relative to a head node of the mesh network. The hop distance is a measure of how many hops the node is from the head node, the head node having a hop distance of zero. Respective subscriber nodes of at least one subscriber node of the mesh network each transmit via an upstream route to the head node a request to subscribe to a topic of a plurality of possible topics, the upstream route being determined based on the hop distance advertised by first routing nodes included in the upstream route. Each first routing node records routing information that identifies the first routing node's adjacent downstream first routing node. The respective subscriber nodes subscribe to the corresponding topic for which it transmitted a request to subscribe.

(Continued)

Subscribing to the corresponding topic provides the respective subscriber nodes with the ability to access contents of a published message associated with the corresponding topic.

20 Claims, 8 Drawing Sheets

(56) References Cited

U.S. PATENT DOCUMENTS

| | | | |
|---|---|---|---|
| 7,835,333 | B2 | 11/2010 | Park et al. |
| 7,839,856 | B2 | 11/2010 | Sinha et al. |
| 7,978,725 | B2 | 7/2011 | Gong et al. |
| 8,144,596 | B2 | 3/2012 | Veillette |
| 8,185,653 | B2 | 5/2012 | Yau et al. |
| 8,213,409 | B2 | 7/2012 | Rudnick et al. |
| 8,355,368 | B2 | 1/2013 | Lenzini et al. |
| 8,699,377 | B2 | 4/2014 | Veillette |
| 8,907,812 | B2 | 12/2014 | Van Wyk et al. |
| 9,043,487 | B2 | 5/2015 | Retana et al. |
| 9,509,570 | B2 | 11/2016 | Joo |
| 9,526,030 | B2 | 12/2016 | Goergen et al. |
| 9,949,204 | B2 | 4/2018 | Palin et al. |
| 10,003,520 | B2 * | 6/2018 | Garcia-Luna-Aceves ............... H04L 45/306 |
| 10,382,307 | B1 * | 8/2019 | Jindal .................. H04W 4/70 |
| 2007/0208702 | A1 * | 9/2007 | Morris ................. H04L 67/26 |
| 2011/0074552 | A1 | 3/2011 | Norair et al. |
| 2012/0135723 | A1 * | 5/2012 | Ramo ............... G06F 16/9535 455/418 |

FOREIGN PATENT DOCUMENTS

| | | |
|---|---|---|
| CN | 106332213 A | 1/2017 |
| EP | 3284287 A1 | 2/2018 |
| MY | 157257 A | 5/2016 |
| WO | WO-09030610 A1 | 3/2009 |
| WO | WO-09036792 A1 | 3/2009 |
| WO | WO-12165938 A1 | 12/2012 |
| WO | WO-17214810 A1 | 12/2017 |

OTHER PUBLICATIONS

Gundogan et al: "draft-gundogan-icnrg-pub-iot-02 Publish-Subscribe Deployment Option for NDN in the Constrained Internet of Things", Mar. 5, 2018 (Mar. 5, 2018), pp. 1-15, XP055603842, Retrieved from the Internet: URL: https://tools.ietf.org/html/draft-gundogan-icnrg-pub-iot-02#page-5 [retrieved on Jul. 9, 2019].

Cenk GUndogan et al: "HoPP: Robust and Resilient Publish-Subscribe for an Information-Centric Internet of Things Information Centric Networking View project Internet of Things View project HoPP: Robust and Resilient Publish-Subscribe for an Information-Centric Internet of Things" Jan. 11, 2018 (Jan. 11, 2018), XP055603876, Retrieved from the Internet: URL: https://www.researchgate.net/profile/MatthiasWaehlisch/publication/322418867HoPP_Robust_and_ResilientPublish-Subscribe foranInformation-CentricInternetofThings/links/5a59ed3ca6fdcc3bfb5bfdb3/HoPP-Ro bust-and-Resilient-Publish-Subscribe-for-a n-Information-Centric-Internet-of-Things.pdf [retrieved on Jul. 9, 2019].

International Search Report and Written Opinion for PCT Application No. PCT/US201/028703, dated Jul. 23, 2019.

* cited by examiner

AUTOMATIC ROUTING IN A MESH NETWORK OF WIRELESS MESSAGING DEVICES

This Application is a 371 U.S. National Phase of International PCT Patent Application No. PCT/US2019/028757 filed on Apr. 23, 2019, which claims priority from U.S. Provisional Application No. 62/661,856 filed on Apr. 24, 2018 and 62/682,552, filed Jun. 8, 2018. The entire contents of these applications are incorporated herein by reference in their entirety.

BACKGROUND OF THE DISCLOSURE

1. Field of the Invention

The present disclosure relates to the art of computing, and more particularly to automated routing in a mesh network of wireless messaging devices.

2. Description of Related Art

Bluetooth is a popular wireless communication protocol for transmitting data over short distances. Bluetooth is commonly used with today's mobile electronic devices, connecting devices such as headphones, headsets, watches, keyboard, mice, mobile phones, tablets, and sporting equipment. While the above-described devices are a one-to-one connection, there can be a desire to couple together many devices in a mesh network. Today's mesh networks can send a message from a source node to a destination node of the mesh network by either flooding the mesh with messages to nodes that are not along a route of the message, or alternatively by using a routing table. The flooding method causes an abundance of unnecessary traffic and causes nodes not included in the route to consume power. However, too much traffic can cause collisions, and energy conservation can be a priority for battery powered devices. As for the routing table method, maintaining a routing table can be a complicated solution, particularly when the mesh network is reconfigured by adding, moving, or removing nodes of the mesh network, or when a node fails. Such reconfiguration can be routine for mobile nodes of the mesh network. The routing table can be stored by a head node that controls the other nodes of the mesh network, and possibly by other nodes of the mesh network. Thus, many copies may be stored, accessed, and require reconfiguration when the mesh network is reconfigured, all of which consumes power.

To avoid the unnecessary messages, some mesh networks use different node types—some nodes are high-powered routing nodes that can handle extra messages for routing purposes. Other nodes are low-power nodes that only receive messages that are specifically to be routed to the low power node. The low-power nodes do not participate in routing of messages because of their power constraints. Additionally, a routing table may be needed to route the messages through the high-powered routing nodes.

While conventional methods and systems have generally been considered satisfactory for their intended purpose, there is still a need in the art for efficient routing in a mesh network, including conserving energy when routing between battery powered devices.

SUMMARY OF THE INVENTION

In accordance with an aspect of the disclosure, a method of routing communication between nodes of at least one network including a mesh network. The method includes each node of the mesh network advertising a hop distance relative to a head node of the mesh network. The hop distance is a measure of how many hops the node is from the head node, the head node having a hop distance of zero. Respective subscriber nodes of at least one subscriber node of the mesh network each transmit via an upstream route to the head node a request to subscribe to a topic of a plurality of possible topics, the upstream route being determined based on the hop distance advertised by first routing nodes included in the upstream route. Each first routing node records routing information that identifies the first routing node's adjacent downstream first routing node. The respective subscriber nodes subscribe to the corresponding topic for which it transmitted a request to subscribe. Subscribing to the corresponding topic provides the respective subscriber nodes with the ability to access contents of a published message associated with the corresponding topic.

In accordance with still another aspect of the disclosure, a non-transitory computer readable storage medium and one or more computer programs embedded therein are provided. The computer programs include instructions, which when executed by a computer system, such as processors of the nodes of the mesh network and a communication network cause the computer system to perform the operations of the method.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

As described above, Bluetooth is a wireless protocol commonly used to couple electronic devices together. These electronic devices commonly are mobile devices and/or use batteries to power the Bluetooth connectivity. While some embodiments are described herein with respect to Bluetooth and the use of advertisements for communicating information between nodes, it should be understood that embodiments can be used with any type of wireless messaging protocol, such as WiFi, Zigbee, Z-Wave, or any wireless protocol currently in existence or developed in the future, using that wireless messaging protocol's methodology for communicating information between the nodes.

Figure 1:
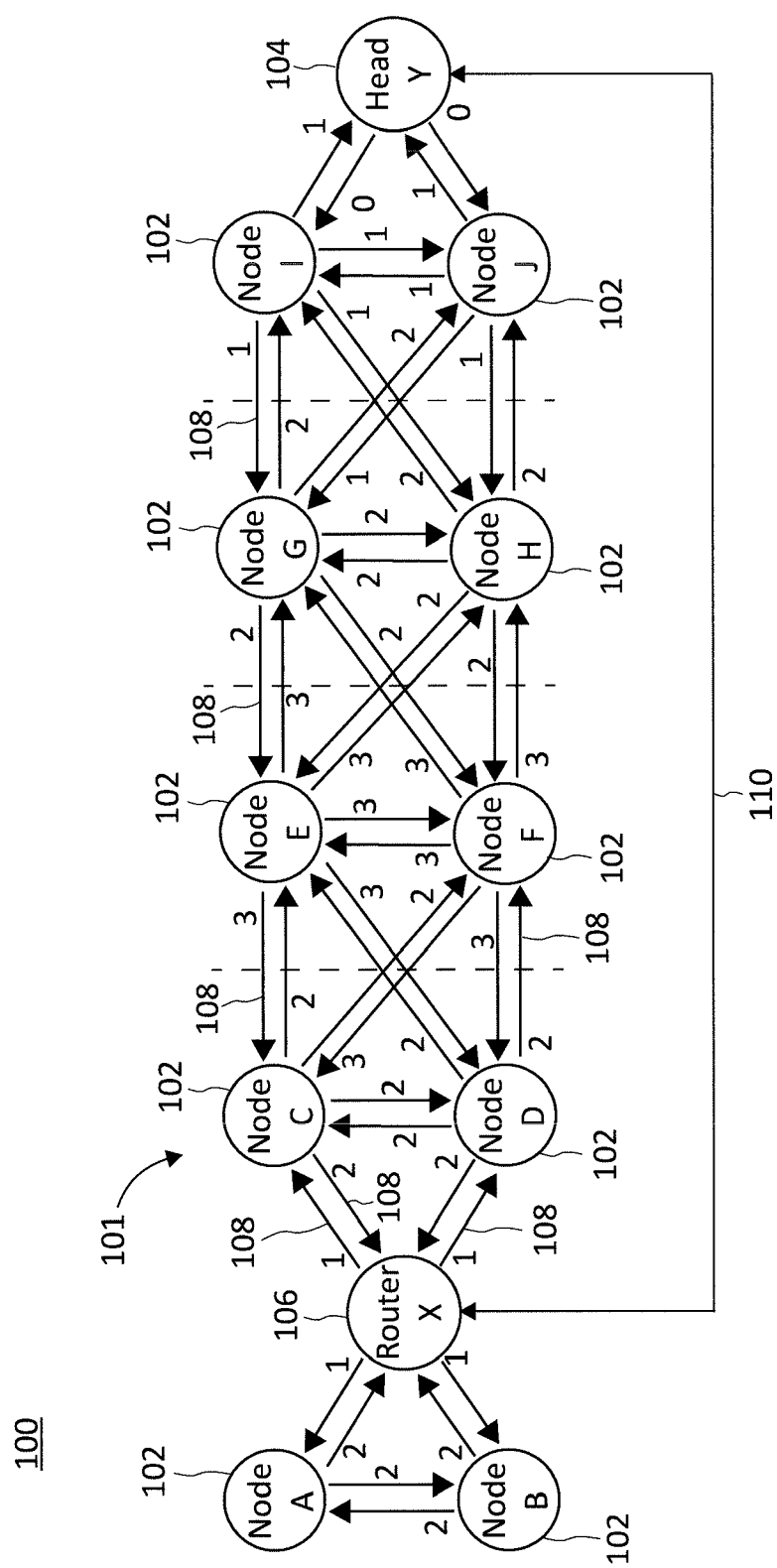
FIG. 1 is a schematic diagram illustrating the operation of one or more exemplary embodiments of a mesh network in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of a mesh network in accordance with the disclosure is shown in FIG. 1 and is designated generally by reference character 100. Other embodiments of a mesh network in accordance with the disclosure, or aspects thereof, are provided in FIGS. 2-8, as will be described.

FIG. 1 shows a schematic diagram of a mesh network 100 having a plurality of nodes 101. Nodes 101 include mesh nodes 102 (also referred to as mesh nodes A-J), head node 104 (also referred to as head node Y) and a router node 106 (also referred to as router node X). When needed, each mesh nodes A-J, router node X, and head node Y can function in the roles of a source node, a destination node, or a routing node, changing functions as needed. Additionally, the nodes 101 can operate in advertising or scanning modes. For example, when using Bluetooth, e.g., Bluetooth low energy (BLE) as the wireless messaging protocol, the nodes 101 operate as peripherals, such as when using an advertising mode, and operate as centrals, such as when using a scanning mode or when initiating a connection to another node 101. Each of the nodes 101 can be considered a "peer." Thus, the mesh network 100 can be considered a peer-to-peer network.

Each node 101 includes a processing device. Mesh nodes 102 may include a functional component, such as a lock or sensor. An application program executable by the processing device is programmed with that node's ID and at least one topic identified by a topic ID to which that node 101 subscribes.

A topic is a subject or context around which a conversation may take place between two or more entities. In embodiments, the topic is an identifier for a conversation between nodes 101. The conversation includes messages that can be published and routed back and forth. Each message is directed to a topic that identifies that message. A node 101 can be programmed to subscribe to a topic, wherein the node 101 is referred to as a subscriber of that topic. Each subscriber of a topic is designated to receive each message identified by that topic. If multiple subscribers subscribe to the same topic they are all designated to receive a copy of a message identified by that topic.

A topic may be device-specific, meaning only one device subscribes to that topic. A topic may be associated with a particular identified device, associated with an identified function of a device, associated with an identified function of the mesh network 100, or can identify information to be exchanged within a certain context. A mesh node 102 that is a lock, for example, may subscribe to a programming topic that is specific to that lock, and may also subscribe to a topic for emergency messages directed to all mesh nodes 102 that are locks, such as a lockdown message.

Further, a node 101 (meaning the node's application program) can further be programmed with at least one topic to which the mesh node 101 can publish, security information (such as encryption keys), and information used by the functional component. For example, when the node 101 is included in a lock for a door, the node 101 may be assigned to a particular room (e.g., hotel room 101) and programmed with an access code that is used to authenticate access rights before actuating a locking mechanism of the functional component.

The programming of a node 101 to subscribe to one or more topics, publish to one or more topics, security information, and information used by the functional component can be performed at the time of manufacture and/or can be performed by a programming device (not shown) that communicates with the node 101, such as via a wired or wireless connection. The wireless connection can use a near field communication protocol, for example Bluetooth or RFID. Additionally, as described in greater detail below, a mesh node 102 or router node 106 can be configured by the head node 104, wherein configuring can include programming.

With reference to router node X, router node X may have capabilities that nodes A-J do not have, such as the capability of router node X to connect to another network that is different than mesh network 100. For example, router node X may connect to a Wi-Fi network or wired LAN network in order to communicate directly to head node Y. Communication via the other network may consume a greater amount of energy than is needed for communication via mesh network 100. Accordingly, whereas nodes A-J may be devices that are powered by a battery having a limited power supply, router node X may have a stronger power supply than nodes A-J. When operating as routing nodes, router node X may have a similar routing as nodes A-J.

It is noted that the term "routing node" refers to any node 101 of the mesh network 100 that is operating in a routing mode, and is differentiated from router node 106 (i.e., router node X), which is a particular node of the mesh network 100 that is provided with a direct connection to the head node Y. In embodiments, the direct connection between the router node X and the head node Y may be through a socket connection over an IP network where messages are sent directly from router node X to head node Y and back. In embodiments the node X and head node Y may use a web or internet based protocol to connect directly to each other, for example a REST API over an HTTPS connection.

Figure 2:
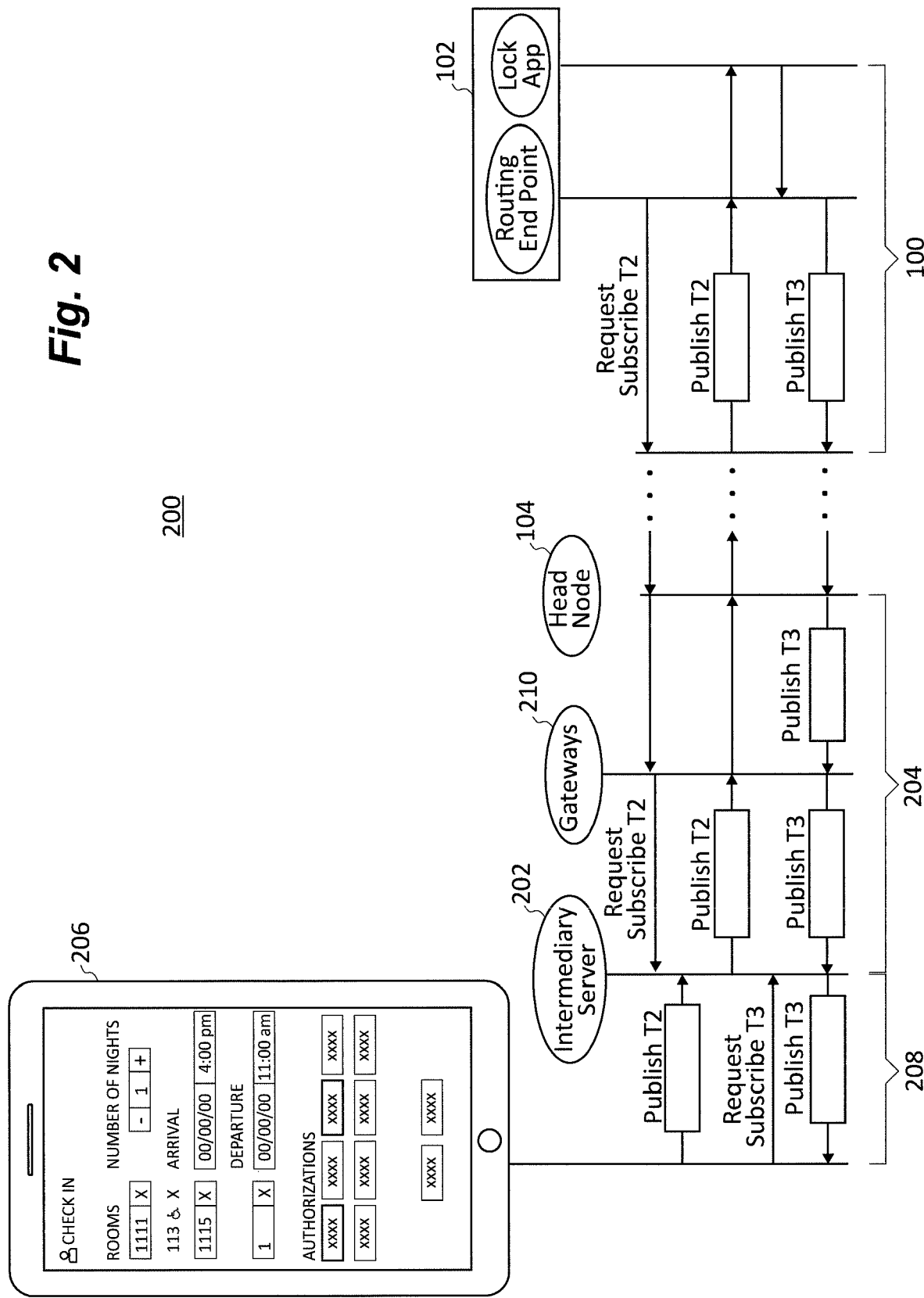
FIG. 2 is a schematic diagram illustrating the operation of a communication network that includes the mesh network shown in FIG. 1.

In embodiments, a user equipment (UE), such as UE 206 shown in FIG. 2 can communicate with head node Y or a router node X through an intermediary server, such as intermediary server 202 shown in FIG. 2. The UE 206 can control the head node Y. The intermediary server 202 can provide a publish/subscribe service for routing messages published on a topic toward a subscriber who has subscribed to that topic. Further, the intermediary server 202 can operate in the cloud, meaning it communicates with the mesh network 100 and/or the UE 206 via the Internet. The UE 206 can publish messages on a topic that are sent via head node 104 or via a router node X 106 and the head node 104 to a mesh node 102 that subscribes to that topic. The mesh nodes 102 can publish messages on a topic via the head node 104 and the intermediary server 202 to the UE 206 when it subscribes to that topic. The nodes 101 can further send and receive messages within mesh network 100, as described in further detail below, by subscribing and publishing to one or more topics.

In embodiments, each time a first node of nodes A-J or X sends (publishes or routes) a message, the message can be automatically transmitted from the first node upstream toward the head node Y by following an upstream route. The term "message" can refer to different types of messages, such as a published message, a request to subscribe, a request to publish, or a request to un-subscribe. As a request to subscribe to a topic is transmitted upstream, each node 101 that is traversed along the upstream route stores route information for that topic. The route information can be used by the head node 104 to route future messages that are published for that topic to downstream subscriber node 101.

The message may be received by a second node if it is along an upstream or downstream route followed by the message. When the message is received by the head node Y, the head node Y determines the next step based on the type of message it received.

Each of the nodes 101 periodically advertises a hop distance relative to the head node Y, such as by operating in the advertising mode. The hop distance is a measure of how many hops the node 101 is from the head node Y. Advertising refers to the nodes 101 sending out an advertisement via an advertisement signal 108 that other nodes 101 in the mesh network 100 can detect and read by scanning. The advertisement can include some information, such as identification and hop distance. When using the advertising mode, the peripheral can use a generic access profile (GAP) to send out the advertisement at a steady rate, for example, 1 advertisement per second. The rate for sending out the advertisement should be fast enough to be useful, but slow enough to conserve energy consumption by nodes 101 that are battery powered devices.

The head node Y is a designated node 101 that can control the other nodes 101. In embodiments, the head node Y can operate autonomously to control the other nodes 101. In embodiments, the head node Y is controlled by the UE 206. In embodiments, the head node Y is included in the UE 206. In embodiments, the UE 206, intermediary server 202, and gateways 210 and head node Y function together to control the other nodes 101 of the mesh network 100.

When using the scanning mode, a node 101 can detect and read an advertisement signal 108 of nearby nodes 101. Nearby nodes 101 are other nodes 101 that are within a scanning range of the node 101, meaning they are within a distance capable of point-point communication with the node to which they are nearby.

The disclosure describes, as an example, the nodes 101 operating in a Bluetooth enabled scanning mode and advertising mode to discover and communicate with nearby nodes 101 as an example, however the disclosure is not limited to Bluetooth or scanning and advertising modes. The disclosure encompasses other wireless network protocols that use different methodologies for each node 101 to have the capability to determine its own distance (which can be expressed as number of hops or another measurement) from the head node 104, and to determine the distance of nearby nodes 101 from the head node 104. Using this knowledge, a particular node 101 can determine whether a nearby node 101 (meaning a node 101 that is nearby the particular node 101) is upstream or downstream relative to the particular node. Specifically, an upstream node would have a smaller hop distance than the node 101, and a downstream node would have a greater hop distance. While Bluetooth is used as an example wireless network protocol, the examples provided can also be implemented using different wireless network protocols.

Accordingly, when a node 101 is described as advertising a hop distance, the term "advertising" refers to communicating the hop distance to at least one other node without being limited to a particular methodology or wireless network protocol. When a node is described as scanning a hop distance, the term "scanning" refers to requesting, receiving, reading, retrieving and/or otherwise obtaining the hop distance without being limited to a particular methodology or wireless network protocol. In embodiments, advertising and scanning are performed using Bluetooth protocol.

A node 101 can use the hop distance advertised by nearby nodes 101 to determine its own hop distance, such as during an initialization, configuration, or reinitialization process. The node 101 can also use the hop distance advertised by nearby nodes 101 to select a node 101 to function as a routing node for routing a message through the mesh network 100, as described in greater detail below.

An initialization process occurs when a mesh node 102 is added to the mesh network 100 or moved within the mesh network 100. During an initialization process the mesh node 102 scans a hop distance advertised by at least one respective nearby node. By scanning, the mesh node operates as a central and uses its scanning mode to detect and read an advertisement signal of nearby nodes. The mesh node 102 determines a minimum hop distance of the hop distances that it scanned and calculates its own hop distance to be the minimum hop distance determined+1. The mesh node 102 can now advertise its own hop distance. By increasing its hop distance by 1, the mesh node 102 can position itself downstream relative to its nearby nodes 101, since the nearby nodes 101 now have a smaller hop distance than the mesh node 102. The mesh node 102 can also send an initialization message to the head node 104 by sending the initialization message to an upstream node.

As shown in FIG. 1, nodes E and F have hop distances=3, nodes A, B, C, D, G, and H have hop distances=2, nodes I, J and the router node X have hop distances=1, and the head node Y has a hop distance=0.

When a node 101 wants to send a message upstream, it selects a routing node and transmits the message to the routing node. When a node 101, for example node E at hop distance of 3, is sending a message upstream in a direction that is towards the head node 104, the routing node is selected from one or more nearby nodes that have an advertised hop distance that is lower than the node's advertised hop distance, for example from the set of C, D, G, H, all at hop distance of 2.

Selection of the upstream routing node from a set of nearby nodes that have an advertised hop distance that is lower than the node's 101 advertised hop distance can also be random or based on other factors, such as prior success in transmitting messages to previously selected nearby nodes and/or signal strength or one or more load balancing criteria, such as the percentage of memory used in the nearby node or such as the percentage of possible routes or topics managed by the nearby node, differences in energy available in the nearby nodes, or differences in path latency in the nearby nodes. The purpose of load balancing is to optimize the use of the whole network of nearby nodes to spread out the energy consumption and to spread out the message routing so that as much as possible a nearby node is not burdened, for example with poor battery life performance. For example, nearby nodes that transmit an advertisement signal that is below a predetermined signal threshold can be eliminated if other nearby nodes are available that transmit an advertisement signal above the signal threshold. Further to the example above, node E, for example, can spread its routing requests between the set of C, D, G, H so that all nodes in the network are utilized and one node is not burdened with routing all the messages and consuming more than its share of energy.

When a node 101 is first initialized, it requests to subscribe to each topic that for which it was programmed to subscribe. The head node 104 can subsequently configure the node 101 to subscribe to additional topics. For example mesh node E requests to subscribe to a topic by transmitting a request to subscribe to the topic via an upstream route to the head node 104. The upstream route is determined based on the hop distance advertised by nearby nodes. The mesh node E detects nearby nodes, selects one of the detected nearby nodes, and sends the subscribe request for the topic to the selected nearby node, which may be, for example Node G. Node G in turn detects its nearby nodes, selects one of its detected nearby nodes, for example Node J, and sends the subscribe request for the topic to Node J. In scenarios there may be many nodes 101, and this process continues until the subscribe request is sent to the head node 104, with each of the selected nearby nodes (e.g., Node G and Node J) being a routing node included in the upstream route. Each routing node of the upstream route records routing information that identifies its adjacent downstream node from which it received the subscribe request.

In particular, the node 101 that is subscribing to the topic records self-subscribing information about itself to indicate that it subscribes to the topic, as identified by its topic ID. The self-subscribing information can include an ID and/or physical address of the node 101 that is subscribing to the topic and the ID of topic. The self-subscribing information includes a timestamp indicating a last time that the subscribe request was submitted by the node 101. The node 101 can further record upstream routing information that indicates an ID and/or physical address of the selected nearby node to which it sent the subscribe request. In this way, the node 101 is aware of the ID and/or physical address of the node 101 from which it can be designated to receive a published message for that topic.

Each routing node that is selected, as the subscribe request is propagated upstream, records upstream and downstream routing information. The downstream routing information includes at least an ID and/or physical address of the mesh node 101 from which it received the subscribe request and the topic ID and may include further routing information from downstream. The routing node can further record a timestamp indicating a last time that the downstream routing information was last updated or last accessed.

The upstream routing information includes the topic ID and an ID and/or physical address of the nearby node that it selected and to which it sent the subscribe request and would expect to receive published messages from in the future. In embodiments, the head node 104 does not record upstream routing information since the head node 104 is the most-upstream node. The routing node can further record at least a timestamp indicating a last time that the subscribe request was sent to an upstream node or when a message was last accessed or received from the upstream node on this topic. In this way, the routing node is aware of the ID and/or physical address of each routing node from which it can be passed a published message for that topic as well as each mesh node 101 to which it will pass or send the published message.

The head node 104 may then request through the intermediary server 202 to subscribe to a particular topic so that when the user device 206 publishes a message on this topic the intermediary server 202 can publish the message to the head node 104, and the head node 104 can then re-publish the message to the mesh network 100, causing the message to be routed along the downstream route.

The head node 104 may use a different messaging protocol when communicating with the intermediary server 202 than when communicating with nodes 101 of the mesh network 100. However, the semantics of these protocols may be similar by each having, for example and without limitation, a publish message type and a subscribe message type amongst others. An example service that can be used by the intermediary server 202 is Azure® IoT Hub which supports MQTT, amongst other protocols. MQTT may be used to exchange published messages between the user device 206, through the intermediary server 202, to the head node 104. The head node 104 may then extract (also referred to as unwrap) a message from the MQTT published message or convert the MQTT published message into another form before transmitting the extracted or converted message downstream within the mesh network 100.

For example, once node E has subscribed to a topic T1, when a message is published on topic T1, the published message on topic T1 is transmitted from the head node 104 along a downstream route via at least one routing node to Node E. The downstream route is determined based on the routing information recorded by the routing nodes of the upstream route that was formed when Node E submitted a request to subscribe to topic T1. In particular, the downstream route is the reverse of the upstream nodes traversed by Node E's request to subscribe to topic T1.

In an example in which the mesh nodes 102 are locks, the UE 206 can publish a message to a topic, such as lock configuration for a particular lock, lock activation to unlock a particular lock, lock lockdown for all locks. The mesh node 102 for the particular lock would already have subscribed to topics for configuration or activation. All of the mesh nodes 102 would have already subscribed to a topic for lockdown. The message published by the UE 206 would be received by the mesh nodes 102 that subscribed to the topic of the message. In this way, the UE 206 can configures or control actions of a lock, even when the UE 206 is remote from the lock and even when the UE 206 has no knowledge of the physical addresses or actual routes used within the mesh network 100.

The terms "data," "information," and "message" are used interchangeably herein but essentially mean the same thing, however more specifically a message contains data that encodes information. The message is transferable from one node 101 to another. The data can be processed by a receiving node 101 to determine the information. In addition to a message containing data, the message may contain additional data that includes an ID for the message, an ID for the topic, ID of the originating node 101, a topic ID for use with any responses to this message, an indication of the type of message (e.g., publish message, publish request, subscribe request, failed route, request configuration) priority information, message integrity information, or other information typically transferred in a digital message. Data contained in messages may be encrypted using various methods well known in the art of message delivery.

When a mesh node 101 requests to publish a message on a topic, the mesh node 101 sends a request to publish the message upstream to the head node 104. The request includes the message that is to be published and identifies the topic associated with the message. In an example, node F sends a request to publish a message on topic T1 (also referred to as a message associated with topic T1) upstream by passing the request to a selected nearby upstream node. The request to publish the message on topic T1 is iteratively propagated by each selected nearby upstream node, that is passed the request to publish, by further passing the request to publish to a selected nearby upstream node until the request to publish reaches an most upstream node. The most upstream node can be the head node 104.

Once the request to publish the message is received by the head node 104, the message is published to the nodes that subscribe to topic T1 by passing the published message along one or more downstream routes away from the head node 104 to nodes 101 that subscribe to the topic T1. Each downstream route is determined based on the routing information stored by the nodes 101 along the upstream routes that were followed by each subscribe request for subscribing to topic T1 that was submitted by a node 101, wherein each downstream route is the reverse of the corresponding upstream route of the request for subscribing to topic T1.

In embodiments, a message published on a topic ID that is being passed via routing nodes along an upstream route may reach a first routing node that had previously recorded downstream routing information for a downstream subscriber that subscribes to the topic ID. The downstream subscriber does not lie along the upstream route and can be reached along an alternative downstream route that includes different routing nodes than the routing nodes of the upstream route along which the message was being passed. The first routing node can be a mesh node 102 or a router node 106, but is not the head node 104. The first routing node 101 can immediately publish the message by passing the message downstream along the alternative downstream route, allowing the message to reach the subscriber using a reduced number of transmissions. The first routing node may optionally continue passing the request to publish the message along the upstream route towards the head node 104.

In embodiments, each node 101, which can include head node 104, that subscribes to the topic T1 receives the published message, whereas each other routing node that does not subscribe itself to topic T1 passes the published message to the next node 101 along the downstream route based on the routing information recorded by the routing node. Receiving the message can include, for example accessing (e.g., for processing, parsing, or reading) the contents of the message. A routing node that is merely passing a message on a route (also referred to as being transmitted, routed, transferred, propagated, or traversing along a route) does not access the contents of the message.

Thus, the published message for a topic can be passed upstream from any mesh node 102 A-J and/or router node 106 to the head node 104 without the use of a routing table or routing information, and then sent downstream to each node 101 that subscribes to that topic using the routing information that was generated when the subscribing nodes sent subscription requests for that topic.

Additionally, when mesh nodes 102 or router nodes 106 are added, moved, removed, or fail, the remaining mesh nodes 102 and router nodes 106 can automatically adapt to the change by refreshing the hop distances that they advertise. The routing information recorded by affected nodes can be updated as well by using a reinitialization process.

When a subscribe or publish request is being passed iteratively upstream from routing node to routing node, if during an iteration it is determined that passing the subscribe or publish request from a first routing node to a second routing node is a failure, the second routing node is regarded as a failed node. The first routing node selects an alternative upstream second routing node based on the hop distance advertised by the alternative second routing node. Additionally, the first routing node sends a request to publish a message for a "failed route" topic that identifies the second routing node and indicates that the second routing node failed when a message was passed to the second routing node. Additionally, the first routing node may further submit a re-subscribe request to subscribe to some or all of the topics that were previously subscribed to by the failed second routing node. These re-subscribe requests are propagated to the head node 104 and define new routes as described above.

The request to publish the message for the "failed route" topic is propagated upstream to the head node 104 after which it is sent downstream to each node 101 that subscribes to the topic "failed route." Each of the nodes 101 can previously subscribe to the topic "failed route" so that they will receive any published "failed route" messages. Each node 101 that receives the "failed route" message, which identifies the failed second routing node, determines if it recorded downstream or upstream routing information that includes the second routing node, and if so, replaces the second routing node with a different node or in some cases removes the subscriptions that had been requested by the failed second routing node.

When a published message for a topic, such as topic T1, is being passed iteratively downstream along a downstream route from routing node to routing node to a node 101 that subscribes to topic T1, if during an iteration it is determined that passing the published message from a first routing node to a downstream second routing node is a failure, the second routing node is regarded as a failed node. The failure can be determined after making reasonable attempts to retry the iteration of passing the published message. The downstream route is the reverse of a corresponding upstream route that was traversed by a request to subscribe to topic T1.

Further, the first routing node sends a request upstream to publish a message for a "failed route" topic that identifies the failed downstream second routing node and identifies the topic of the message, which in this example is T1.

The request to publish the message for the "failed route" topic is propagated upstream to the head node 104 after which it is sent downstream to each node 101 that subscribes to the topic "failed route." As in the previous example, each of the nodes 101 can previously subscribe to the topic "failed route" so that they will receive any published "failed route" messages. Each node 101 that receives the "failed route" message, which includes the routing nodes in the downstream route that included the failed node to provide an alert regarding the failed node and that the published message that could not be delivered to the failed node.

The first node further determines each instance of recorded downstream or upstream routing information that includes the second routing node. The first node further determines to be orphaned topics each topic identified in each of these instances determined. The first node further removes each instance from its upstream and downstream routing information recorded that includes the ID or address of the failed node.

The first node starts an iterative process for each node along the corresponding upstream route in which the node transmits an unsubscribe message to an adjacent upstream node along the corresponding upstream route to instruct it to unsubscribe from each of the orphaned topics. The adjacent upstream node removes each of the instances of its recorded upstream and downstream routing information that identifies any of the orphaned topics.

A reinitialization process can be triggered, for example, by a reinitialization instruction message from the head node 104, whenever a reconfiguration occurs, or at regular intervals, or when a "failed route" message is received by the head node 104. During a reinitialization process, a mesh node 101 can erase temporarily stored information from its memory, such as its own hop distance, topics to which the mesh node 101 publishes, topics to which the node 101 subscribes, upstream or downstream routing information for one or more topics, identification (ID) of nearby nodes, hop distances of the nearby nodes, and/or ID of a selected nearby node. The reinitialization process can include re-initializing the node (performing an initialization process) to determine its hop distance.

Reinitialization can be triggered in several scenarios. In one scenario, a downstream broadcast is sent to all nodes 101 that indicates that all of the downstream nodes 101 need to reinitialize.

In another scenario, a first node 101 attempts to send a message to a second node 101, but the second node 101 is no longer available. The first node 101 may have used a stored result from a previous scan from some time period back that included the second node 101 as an available nearby node. On the failure to send the message, the first node 101 can initiate a reinitialization process to reinitialize its own hop distance.

In another scenario, a node 101 that is added to the network 100 or reinitialized may send a reinitialization instruction message to all of its nearby nodes to indicate that node 101 was just added to the network 100. In this way, each node that performs a reinitialization process can propagate a reinitialization instruction message to other nodes 101 that have not yet reinitialized.

In embodiments, an advertised (or otherwise communicated) hop distance can include an additional parameter, such as a reinitialization flag, to indicate whether the node has recently reinitialized or not. For example, the reinitialization flag can be initially set to '0'. Before a reinitialization process, all nodes 101 advertise a reinitialization flag of '0'. When one of the nodes 101 reinitializes, its reinitialization flag is toggled to '1' The node 101 then sends a reinitialization instruction message to each of its nearby nodes that have reinitialization flags currently set to '0' to reinitialize also. Each of the nearby nodes then reinitializes and toggles their respective reinitialization flags to '1'. The reinitialization process then propagates through the network 100 until all nodes 101 have reinitialized. A future reinitialization process may then utilize the flag by toggling it back to 0 or to some other value to indicate the status of the future reinitialization process.

To prevent constant reinitialization of nodes 101, the head node 104 can control the reinitialization process, such as by using one of at least a broadcast message and a specified reinitialization flag. A configuration update process occurs when a node 101 receives a configuration update message that originated from the head node 104. A configuration update process can include updating software using software provided via the configuration update message. The software updated can include application data used by the node 101. The application data can provide the node 101 with a particular functionality. For example, if the node 101 is a lock, then the application data can include data that configures the node 101 to operate as a lock based on control parameters. The configuration update process can include updating the control parameters. In another example, if the node 101 is a digital sign, then the application data can provide the node 101 with a particular functionality to display particular information on the sign. The configuration update process can include updating the information to be displayed. Additionally, the configuration update process can include a reinitialization process.

The head node 104 can communicate with the nodes 101 using publish and subscribe techniques (submitting requests to publish or subscribe and publishing messages) for managing configuration of the nodes 101 at any time. A node 101 may send a request to publish on the topic "request configuration" which requests that the node 101 be configured by the head node 104 to enable the node 101 to subscribe to additional topics. The head node 104, which subscribes to the topic "request configuration" responds with published messages that include configuration data. These response messages may be published on a topic ID that is specific to the requesting node 101. The process can be repeated as needed.

Nodes 101 can be configured, e.g., either initially or by the head node 104, to submit periodic status messages to the head node 104. The head node 104 can track the status messages from each node 101. If a status message is expected from a node 101 but not received, the head node 104 can assume that the node 101 has failed. The head node 104 can publish messages to repair downstream routes that include the failed mesh node 101 or provide alerts to trigger further inspection (human or automated), such as to determine a root cause of the failure, e.g., a dead battery or some other type of failure.

The self-subscribing information, upstream routing information, and/or downstream routing information can be stored temporarily based on a configurable time-to-live (TTL) interval that causes the information to be deleted after passage of the TTL interval from the recorded timestamp. This ensures that stale information will not be stored by the nodes 101 that have limited memory capacity. The TTL may be updated when a message has attributes that match the stored information, including, for example, at least one of a node ID, a topic ID, a downstream node ID, or an upstream node ID. For example, when a downstream node publishes a message on a 'status' topic to an upstream routing node, the upstream routing node may update the TTL on all routing information pertaining to the downstream node. Further, if the downstream node does not send or receive any messages from the upstream routing node, the TTL interval will eventually pass and the upstream routing node may delete routing information pertaining to the downstream node.

FIG. 2 shows a communication network 200 that includes a mesh network 100. The mesh network 100 communicates with the intermediary server 202 via at least one first network 204. One or more UE 206 communicates with the intermediary server 202 via at least one second network 208.

The intermediary server 202 can be a network server, such as a web server, application server, communication server, banking server, securities trading server, etc., that includes a processing device and can function as a liaison between clients, the clients being the head node 104 of the mesh network 100 and the UE 206. As shown in FIG. 1, the mesh network has multiple mesh nodes 101. The intermediary server 202 can forward messages between such clients. In addition the intermediary server 202 can read, store, lookup, and output information associated with these messages. Although one mesh network 100 and one UE 206 are shown, the intermediary server 202 can communicate with more than one mesh node 100 and/or with more than one UE 206. The intermediary server 202 can be a cloud based server that communicates via the Internet with clients.

The UE 206 can be a user operated computing device, such as a mobile computing device (e.g., smart phone, tablet, or laptop computer), desk top computer, computer terminal, web-connected machine or consumer device, etc. The first network 204 and the second network 208 can be the same or different types of network that can each include wired or wireless communication links that communicate via a local area network (LAN), a general wide area network (WAN), and/or a public network (e.g., the Internet), a personal communication service (PCS) network, a VLAN, etc. One or more gateways 210 can provide an interface that enables communication between the head node 104 and the intermediary server 202. In embodiments, any of gateway 210, intermediary server 202, UE 206, and head node 104 may be physically or functionally combined in one or several combinations.

In embodiments, the nodes 101 of the mesh network 100 are locks, such as door locks of a hotel that secure entry to respective hotel rooms, and the UE 206 is operated by a front desk clerk. The front desk clerk and UE 206 can be remote from the hotel and communicate with the mesh network 100 and its nodes via the intermediary server 202 and networks 204 and 208. An additional UE 206 may be a front desk server that is deployed at the hotel. An additional UE 206 may be hosted in the cloud as a primary or backup server to the front desk server on premise.

The nodes 101 can communicate with the UE 206 using the publish/subscribe technique described. For example, the UE 206 can publish messages on topic T2 and subscribe to a topic T3. In the example shown, a mesh node 102 subscribes to topic T2 by submitting a request to subscribe to topic T2 via an upstream route to head node T2. Head node 104 provides the subscribe request via gateway 210 to intermediary server 202. The intermediary server records information about each subscriber and publisher and the topics to which they subscribe and publish. UE 206 submits to the intermediary server 202 a request to publish a message on topic T2. Upon receiving the published message on topic T2, the intermediary server 202 then determines the nodes that have already subscribed to T2. Based on the information it previously recorded that head node 104 sent a request to subscribe to T2, the intermediary server 202 determines to publish the message on topic T2 to the head node 104. The head node 104 previously recorded downstream routing information about the downstream node that previously sent the request to subscribe to topic T2. The head node 104 uses the downstream routing information to publish the message for T2 to the mesh node 102 that subscribed to T2 by sending the published message along a downstream route in the reverse order of the upstream route via which the request to subscribe was received from mesh node 104.

Furthermore, in the example shown, the UE 206 subscribes to topic T3 by submitting a request to subscribe to the intermediary server 202. The intermediary server 202 stores information about the UE 206 subscribing to topic T3. Mesh node 102 of mesh network 100 submits a request to publish a message on topic T3. The head node 104 receives this request to publish a message on topic T3, which was routed upstream from the mesh node 102. The head node 104 publishes the message on topic T3 via gateway 210 to the intermediary server 202. In response to receiving the published message on topic T3, the intermediary server 202 determines based on the information it recorded about the UE 206 subscribing to topic T3 that the message published by the head node 104 should be published to UE 206.

With reference now to FIGS. 3-6, shown are flowcharts demonstrating implementations of various exemplary embodiments. It is noted that in embodiments, the order of operations shown in FIGS. 3-6 is not required, so in principle, the various operations may be performed out of the illustrated order or in parallel. Also, in embodiments, certain operations may be skipped, different operations may be added or substituted, or selected operations or groups of operations may be performed in a separate application following the embodiments described herein.

In accordance with an example method of the disclosure, respective nodes of a mesh network, such as nodes 101 of mesh network 100 shown in FIGS. 1 and 2, request to subscribe to various topics. The nodes of the mesh network can subscribe to topics of a plurality of possible topics, wherein a node that subscribes to a topic is also referred to as a subscriber node. The nodes of the mesh network can also be nodes of a communication network 200.

Each node of the mesh network advertises a hop distance relative to a head node of the mesh network. The hop distance is a measure of how many hops the node is from a head node, such as head node 104, wherein the head node has a hop distance of zero.

Each subscriber node can transmit via an upstream route to the head node a request to subscribe to one of the topics. For example, a request to subscribe to a topic can be transmitted along an upstream route that is determined based on the hop distance advertised by first routing nodes included in the upstream route. The respective first routing nodes record routing information. The routing information identifies the node from which it was passed the request to subscribe to the topic. The node identified is the first routing node's adjacent downstream first routing node. Once the respective subscriber nodes have requested to subscribe to a topic, they are subscribed to that topic. Subscribing to the corresponding topic provides the respective subscriber nodes with the ability to access contents of a published message associated with the corresponding topic.

Figure 3:
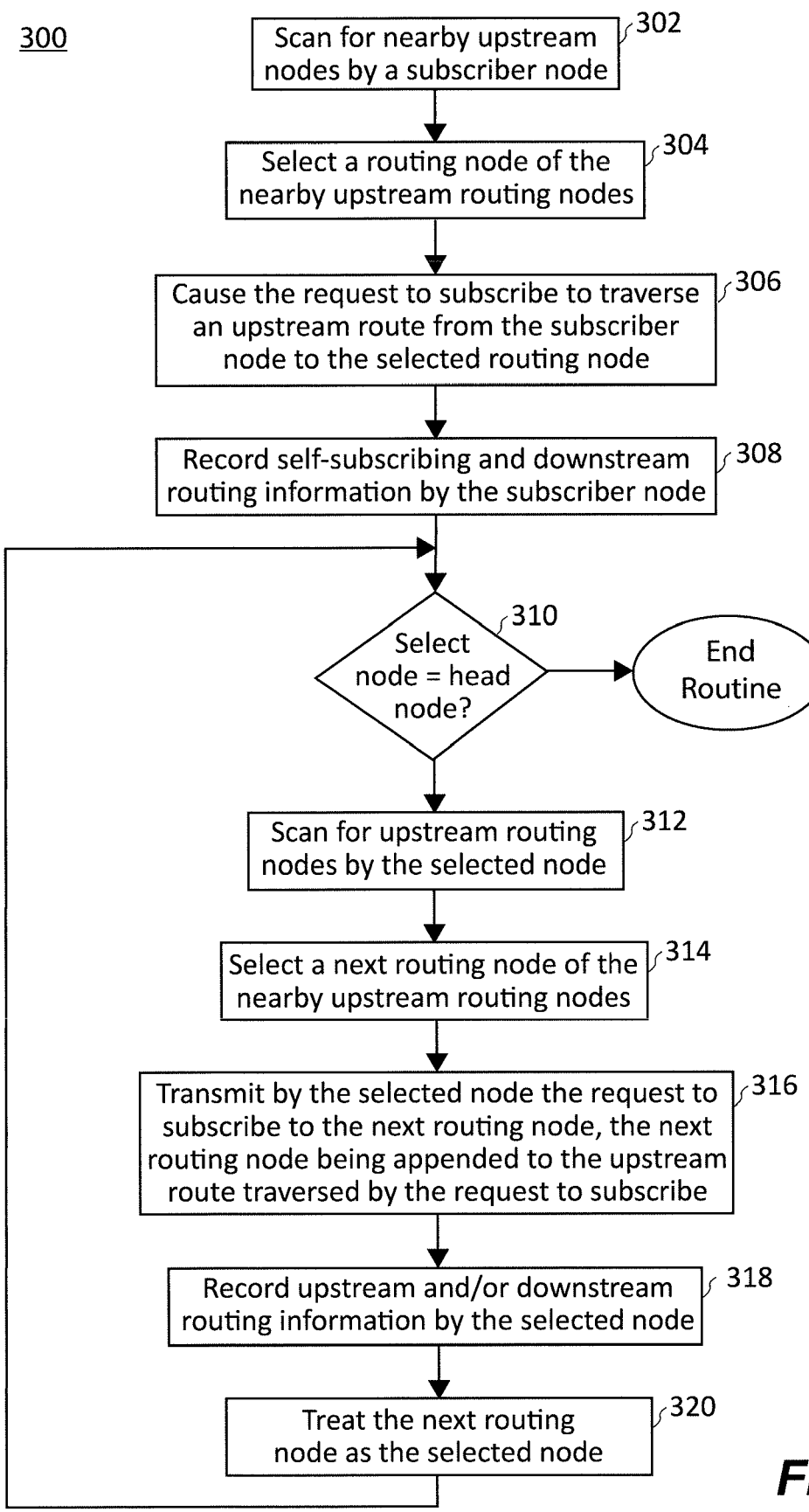
FIG. 3 is a flowchart showing example operations performed by the communication network shown in FIG. 2 in accordance with embodiments of the present disclosure.

In accordance with the example routine shown in flowchart 300 of FIG. 3, nodes of the mesh network can subscribe to various topics. At operation 302, a subscriber node scans for nearby upstream routing nodes. At operation 304, the subscriber node selects a routing node from the nearby upstream routing nodes. At operation 306, the request to subscribe is caused to be passed along an upstream route from the subscriber node to the selected routing node. At operation 308, the self-subscribing and downstream routing information is recorded by the subscriber node. At operation 310, a determination is made whether the selected node is the head node. Operations 312-320 are performed iteratively until it is determined at operation 310 that the selected node is the head node or associated with an alternate route, after which the method at FIG. 3 ends.

At operation 312, the selected node scans for nearby upstream routing nodes by the selected node. At operation 314, the selected node selects a next routing node of the nearby upstream routing nodes. At operation 316, the selected node transmits the request to subscribe to the next routing node. The next routing node is thus appended to the upstream route traversed by the request to subscribe. At operation 318, the selected node records upstream and/or downstream routing information. At operation 320, the next routing node is treated as the selected node.

In embodiments, the routing information recorded by the respective first routing nodes of the first upstream route includes at least one of downstream routing information and upstream routing information. The downstream routing information including an ID and/or physical address of a node from which the first routing node received the first request and an ID of the first topic. The upstream routing information including an ID and/or physical address of a node to which the first routing node passed the first request to subscribe and an ID of the first topic.

In embodiments, the downstream routing information includes an ID and/or physical address of a single downstream node of the at least one routing node and the upstream routing information includes an ID and/or physical address of a single upstream node of the at least one routing node.

In embodiments, the first routing nodes are selected by respective adjacent downstream first routing nodes when passing the subscription request along the first upstream route. The first routing nodes can be selected based on being upstream from and within a distance capable of point-point communication with the corresponding adjacent downstream first routing node. The, upstream direction is determined based on the hop distances advertised by the nodes. For example, the upstream direction is determined based on the hop distances advertised by the adjacent downstream node and the adjacent downstream node's nearby nodes that are close enough for point-point communication.

In accordance with a method of the disclosure, once a request to publish a message has been submitted, it is passed to the head node. In this example the published message is associated with the first topic. The published message is transmitted from the head node along at least one downstream route to a subscriber node of one or more subscriber nodes that subscribe to the first topic. Each downstream route has at least one second routing node. A first downstream route of the at least one downstream route is determined based on the routing information recorded by the first routing nodes of a first upstream route via which a first request to subscribe to the first topic was transmitted.

For example, when a first subscriber node subscribes to the first topic, and the head node receives a request to publish a message associated with the first topic, the message is passed from the head node along a first downstream route to the first subscriber node. The first downstream route is a reverse route of the first upstream route and including the first routing nodes. The respective first routing nodes are determined for the first downstream route by the corresponding adjacent upstream node of the first downstream route based on at least one of the downstream and upstream routing information recorded by the adjacent upstream node. The message is published to the first subscriber node.

In embodiments, when the first subscriber node submits the first request to subscribe to the first topic, it records self-subscriber information that identifies the first subscriber node as subscribing to the first topic. Thus, when a message associated with the first topic is passed down the first downstream route, when the message arrives at the first subscriber node, the first subscriber node is recognized as subscribing to the first topic based on the recorded self-subscriber information. The message is published to the first subscriber node once the message arrives at the first subscriber node and it is recognized that the first subscriber node subscribes to the first topic.

Figure 4:
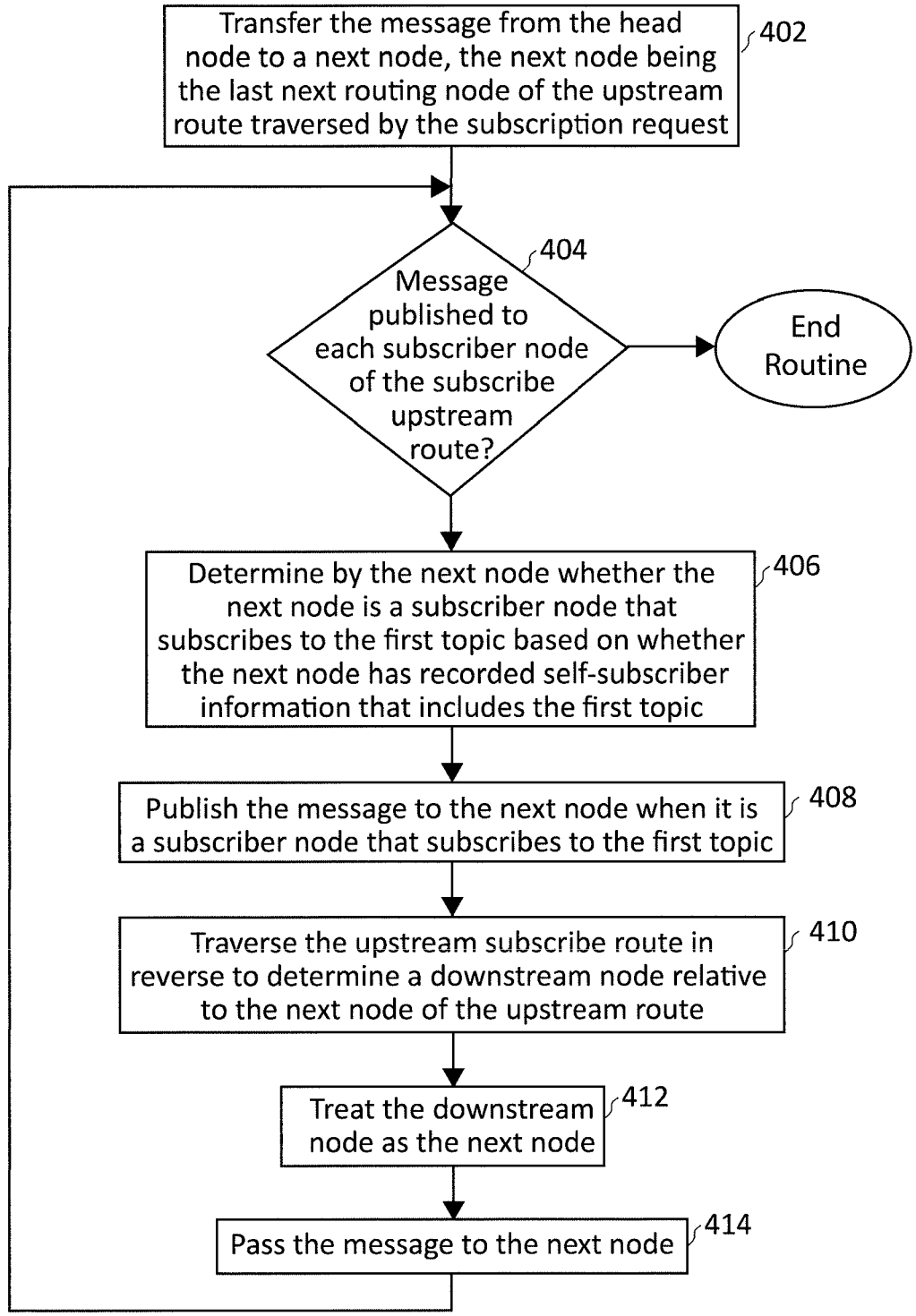
FIG. 4 is a flowchart showing example operations performed by the communication network shown in FIG. 2 in accordance with embodiments of the present disclosure.

FIG. 4 shows a flowchart 400 that illustrates operations of an example routine for a published message associated with the first topic to be transferred from the head node to at least one subscriber node that subscribes to the first topic. At operation 402, the message is transferred from the head node to a next node. The next node is the last next routing node of the upstream route that was traversed by the subscription request. At operation 404, it is determined whether the message has been published to each subscriber node of the upstream route. Operations 406-414 are repeated until it is determined at operation 404 that the message has been published to each subscriber node of the upstream route, after which the routine described in FIG. 4 ends.

At operation 406, the next node determines whether the next node is a subscriber node that subscribes to the first topic. This determination is based on whether the next node has recorded self-subscriber information that includes the first topic. At operation 408, when the next node is a subscriber node that subscribes to the first topic, the message is published to the next node. At operation 410, the upstream route is traversed in reverse to determine a downstream node relative to the next node of the upstream route. At operation 412, the downstream node is treated as the next node. At operation 414, the message is passed to the next node.

In accordance with a further method of the disclosure, a node of the mesh network can publish a message associated with a topic. The published message is routed upstream to the head node. Once the published message has reached the head node, the message can be transferred from the head node to any subscriber nodes that subscribes to the first topic, such as illustrated in the flowchart shown in FIG. 4.

More particularly, when a node of the mesh network submits a second request to publish a message associated with the first topic, the second request is passed along a second upstream route of second routing nodes of the mesh network from the node that submitted the second request. The respective second routing nodes of the second upstream route are selected by a corresponding adjacent downstream node of the second upstream route from upstream nearby nodes of the adjacent downstream node that are within a distance capable of point-point communication with the adjacent downstream node. The upstream direction of the respective second routing nodes of the second upstream route is determined based on the hop distances advertised by the adjacent downstream node and the adjacent downstream node's nearby nodes.

Figure 5:
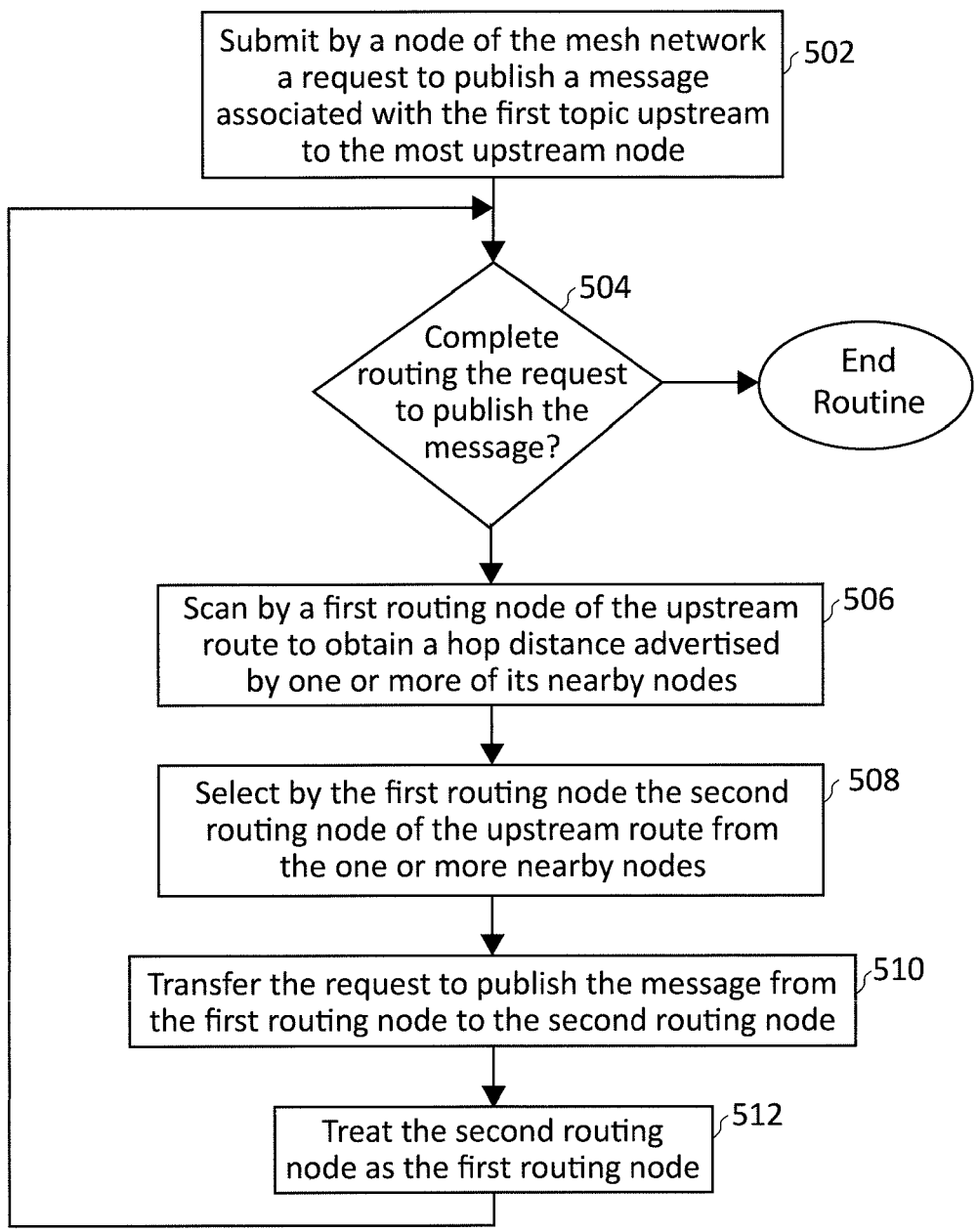
FIG. 5 is a flowchart showing example operations performed by the communication network shown in FIG. 2 in accordance with embodiments of the present disclosure.

FIG. 5 shows a flowchart 500 that illustrates operations of an example routine for routing a request to publish a message to the head node or to an alternative route. At operation 502, a request to publish a message associated with the first topic is submitted by a node of the mesh network upstream to the most upstream node. At operation 504, a determination is made whether routing the request to publish the message is completed. In other words, it is determined whether the request to publish the message has been transferred to the head node or to a node that is associated with an alternative downstream route.

For example, while being routed along an upstream route, the request to publish the message can be passed to a routing node that had previously recorded downstream routing information for a downstream subscriber that subscribes to the topic ID. The downstream subscriber may not lie along the upstream route and can be reached along an alternative downstream route that includes different routing nodes than the routing nodes of the upstream route along which the message was being passed. In this scenario, the message can be published by passing the message downstream along the alternative downstream route, allowing the message to reach the subscriber by using a reduced number of transmissions. The method can optionally continue at operation 506 by continuing to pass the request to publish the message along the upstream route towards the head node.

Operations 506-512 are repeated until it is determined at operation 504 that routing the request to publish the message is completed, after which the routine ends. At operation 506, a first routing node of the upstream route scans to obtain a hop distance advertised by one or more of its nearby nodes or utilizes a previous scan result. At operation 508, the first routing node selects a second routing node of the upstream route from the one or more nearby nodes or uses a previous upstream selection. If using a previous upstream selection, the scanning procedure at operation 506 can be omitted. At operation 510, the request to publish the message is transferred from the first routing node to the second routing node. At operation 512, the second routing node is treated as the first routing node.

Figure 6:
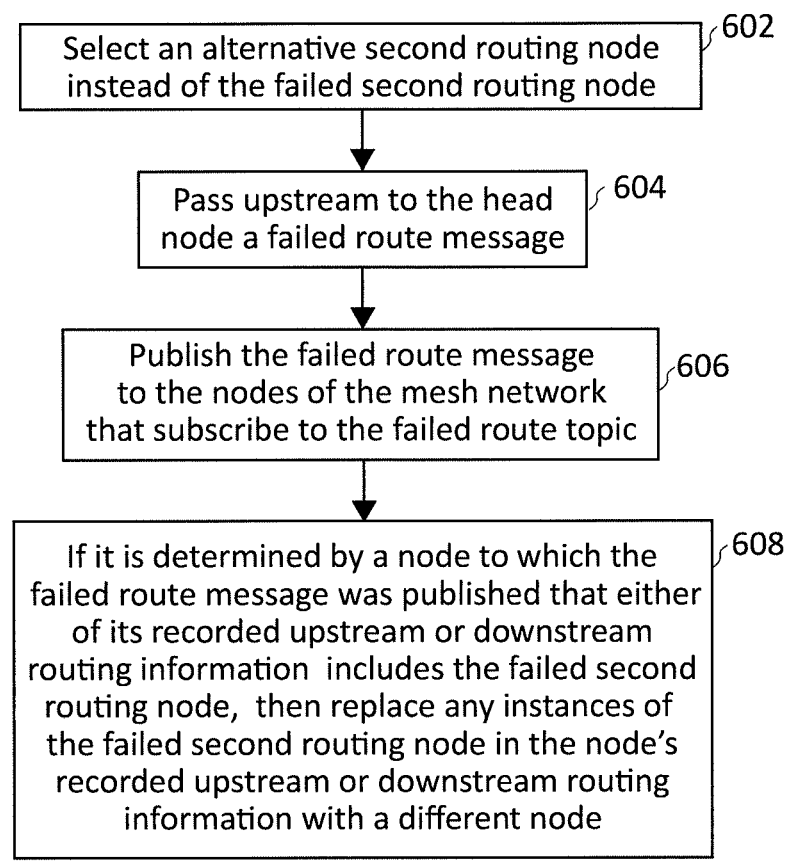
FIG. 6 is a flowchart showing example operations performed by the communication network shown in FIG. 2 in accordance with embodiments of the present disclosure.

FIG. 6 shows a flowchart 600 that illustrates operations of an example routine performed when passing a request to publish a message along its upstream route from a first routing node to a second routing node is unsuccessful. At operation 602, an alternative second routing node is selected instead of the second routing node. The alternative second routing node can be selected based, at least in part, on the hop distance advertised by the alternative second routing node. At operation 604, a request to publish a message associated with a failed route topic (also referred to as a failed route message) is passed upstream to the head node. The failed route message further identifies the second routing node as a failed node.

At operation 606, the failed route message is published to the nodes of the mesh network that subscribe to the failed route topic. At operation 608, if it is determined by a node to which the failed route message was published that either of its recorded upstream or downstream routing information includes the second routing node that failed, then the node replaces the failed second routing node in its recorded upstream or downstream routing information with a different node. This can be performed by the node scanning its nearby nodes and selecting the different node based on predetermined criteria.

Figure 7:
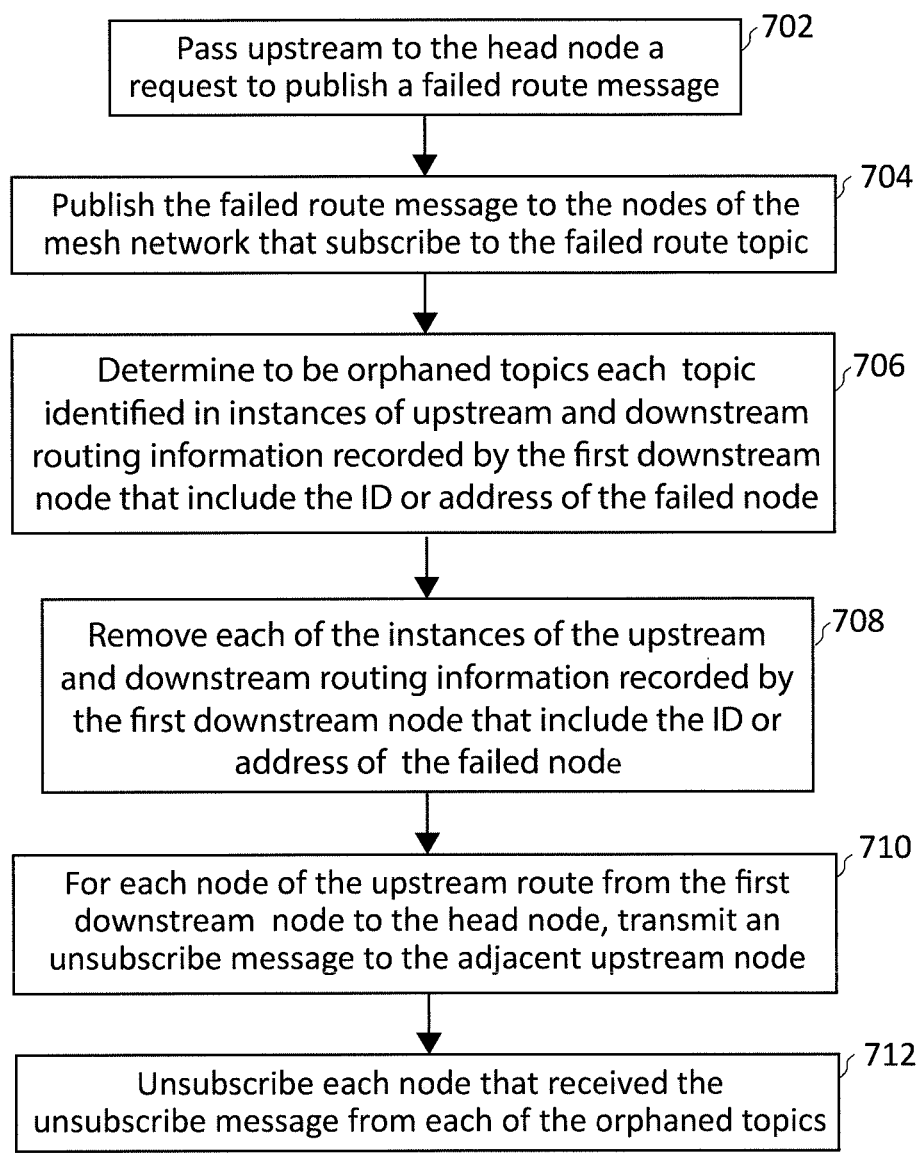
FIG. 7 is a flowchart showing example operations performed by the communication network shown in FIG. 2 in accordance with embodiments of the present disclosure.

FIG. 7 shows a flowchart 700 that illustrates operations of an example routine performed when passing the message from the head node along the downstream route toward the subscriber node in a scenario in which it is determined that a failure occurred when passing the message from a first downstream node to a second downstream node of the downstream route. At operation 702, a request to publish a failed route message is passed upstream to the head node. The failed route message further identifies the second routing node as a failed node. At operation 704, the failed route message is published to the nodes of the mesh network that subscribe to the failed route topic. At operation 706 each topic identified in instances of upstream and downstream routing information recorded by the first downstream node that include the ID or address of the failed node are determined to be to be orphaned topics.

At operation 708, each of the instances of the upstream and downstream routing information recorded by the first downstream node that include the ID or address of the failed node are removed. At operation 710, for each node of the upstream route from the first downstream node to the head node, an unsubscribe message is transmitted to the adjacent upstream node. The unsubscribe message instructs the adjacent upstream node to unsubscribe from each of the orphaned topics. At operation 712, each node that received the unsubscribe message unsubscribes from each of the orphaned topics. Unsubscribing from each of the orphaned topics includes removing each of the instances of the upstream and downstream routing information that identify any of the orphaned topics recorded by the node that received the unsubscribe message.

Regarding configuration of the nodes of the mesh network, in embodiments, a node of the mesh network can receive a configuration that includes at least one of a topic to which the node is configured to subscribe and a topic for which the node is configured to publish. A first configuration can be received from a programming device that is capable of configuring the mesh nodes, such as via wireless communication (e.g., Bluetooth). The head node may subscribe to the first topic and publish messages on the second topic. The node may subscribe to the second topic and publish to the first topic. The first topic can be a request to be configured with an additional configuration. The second topic can be configuration data for configuring the specific node.

In this scenario, the node can submit a request to publish a first message associated with the first topic as a request for additional configuration. The head node can receive the request to publish the first message and publish the first message to itself. The head node can publish a second message associated with the second topic to the node with configuration data that provides the additional configuration. The node can receive the second message and use the configuration data to further configure the node.

In embodiments, the first configuration can include only the first topic to which the node is configured to publish and only the second topic for which the node is configured to subscribe. The node can request and receive the additional configuration at any time to obtain a full configuration and/or to update its configuration.

In embodiments, the node is configured to publish on a first topic and the head is configured to subscribe to the first topic. The node submits a request to publish a first message on the first topic. This first topic allows the node to report its status, and the first message reports a status of the node. The head node receives the request to publish the first message and publishes the first message to itself. The head node thus received the status report about the node and can thus continue to receive such status reports and track the status of the node based on receipt of the first message over time.

In embodiments, at least one of the upstream routing information and the downstream routing information is deleted after a predetermined time-to-live relative to a predetermined event, such as relative to the time that the at least one of upstream routing information and downstream routing information was recorded.

In embodiments, messages can be exchanged between nodes of the mesh network and a device, such as UE 206 shown in FIG. 2, such as via an intermediary server (also referred to as an intermediary node), such as intermediary server 202. The intermediary node can communicate with the device and the mesh network. Communication between the device and the mesh network uses a different network than the mesh network. The device can be not included in the mesh network. In an example scenario, the intermediary node can receive from the device a request to publish a message associated with the first topic. The intermediary node can send the request to publish the message to the head node. This allows the head node to publishing the message to the nodes of the mesh network that subscribe to the first topic, such as illustrated in flowchart 400 of FIG. 4.

In embodiments, the intermediary node can receive a request to subscribe to a second topic from the device. The intermediary node can further receive a request to publish a message associated with the second topic from the head node. The intermediary node can send the message to the device based on the device subscribing to the second topic.

In embodiments in which the mesh nodes are door locks, such as door locks in a hospitality entity (such as a hotel, motel, or resort), one or more of the above described embodiments can be used to maintain the door locks of the entity. In such an embodiment, each of the mesh nodes described above is a door lock and the head node can be a computer system that is accessible by a variety of hotel employees, such as for managing reservations, the front desk, housekeeping, and security.

There are a variety of operations that can be performed from a head node to a door lock. For example, the front desk of a hotel might desire to reprogram a door lock to accept a certain key card or to not accept a certain key card or to accept an entry via a mobile electronic device (such as a smartphone). In such a case, the front desk of the hotel would use their computer system to direct the head node to issue an instruction to the correct door lock. For example, with reference to FIG. 1, each of the mesh nodes A-J can represent a room number of an associated door lock.

Information from the door locks to the head node might be sent more rarely. There can be audit information transmitted from each door lock to the head node. The audit information can include information as to when the door lock was accessed, by which card the lock was accessed, and at what time.

Because the timeliness of the audit information might not be of high importance to the hospitality entity, it might not be desirable to send this type of information every time the door lock is used. By reducing the number of times this type of information is sent to the head node, the battery life of each door lock can be lengthened. In such a situation, each of the door locks can contain a memory and use the memory to store the audit information. Thereafter, in a periodic manner (such as twice a day), the door lock can send its audit information to the head node, using the embodiments described herein. Other type of information that could be treated as "store and forward" type of information includes battery status, diagnostic information, how long a guest was in the room, the time of use of each lock, room temperature, and each time the room was accessed by staff.

The head node can also send information to all of the door locks at regular intervals, such as calendar date and time synchronization information or instructions to send audit information or diagnostic information. Another type of information that can be sent from the head node to each of the door locks is information that is used by each door lock, such as information to deactivate a master key. Such information is needed by each door lock in the mesh network, so it would be sent in a broadcast format. A broadcast format is a type of message in which each door lock not only retrieves and uses the information, but also forwards the message to the next node in a routing table or to each nearby node(s) that is downstream of the node.

A type of information that may be sent immediately from the door locks to the head node is information referred to as "exceptions." One example of an exception is an unauthorized entry. For example, if the key for room 922 is used for room 926, an exception can be generated and the information is immediately sent to the head node. A similar situation can occur if a master key is used when it is not supposed to be used. For example, a housekeeper who is supposed to be cleaning floor 5 uses her key card to open a door on floor 4. Other types of information that are treated as an exception can include a door being held open for a long period of time, or a locking plan change (e.g., when each key card is set to automatically expire after checkout).

The head node can also send a query to the door locks to request information. For example, if the head node wants to know the last time a specific master key was used, it can send a query to each door lock in the mesh network (or subset thereof). The response to the query can be treated in the same manner as an exception in that the response is immediately transmitted to the head node, as opposed to being stored in the door lock for later transmission during the periodic audit.

There are certain types of messages that may originate in one door lock to be sent to another door lock or to another device that is participating in the peer-peer mesh network without having the head node involved. For example, a door lock could send a message indicating that a guest just entered the room to a thermostat or similar room controlling device or service that is part of a room management system. In response to receiving the data, the thermostat could operate to a set point for comfort rather than to a set point for energy savings. Further, in this example the thermostat or room management device could also operate as a router node, such as router node 106 shown in FIG. 1, with a high-speed connection to the head node. Other example types of devices that originate messages may include sensors, such as smoke detectors, occupancy sensors, door sensors, or the like, to mention a few non-limiting examples. Other examples of router nodes could include lighting systems, lighted exit signs, wireless network routers, fire detection systems, to mention a few non-limiting examples.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of processing systems of nodes 101 of the mesh network 100 shown in FIG. 1 may be implemented or executed by one or more computer systems. For example, the processing system of a node 101 can be implemented using a computer system such as example computer system 802 illustrated in FIG. 8. In various embodiments, computer system 802 may be a stationary or mobile electronic device and/or include one or more of a field-programmable gate array (FPGA), application specific integrated circuit (ASIC), microcontroller, microprocessor, or the like.

Computer system 802 is only one example of a suitable system and is not intended to suggest any limitation as to the scope of use or functionality of embodiments of the disclosure described herein. Regardless, computer system 802 is capable of being implemented and/or performing any of the functionality set forth hereinabove.

Computer system 802 may be described in the general context of computer system-executable instructions, such as program modules, being executed by a computer system. Generally, program modules may include routines, programs, objects, components, logic, data structures, and so on that perform particular tasks or implement particular abstract data types. Computer system 802 may be practiced in distributed data processing environments where tasks are performed by remote processing devices that are linked through a communications network. In a distributed data processing environment, program modules may be located in both local and remote computer system storage media including memory storage devices.

Figure 8:
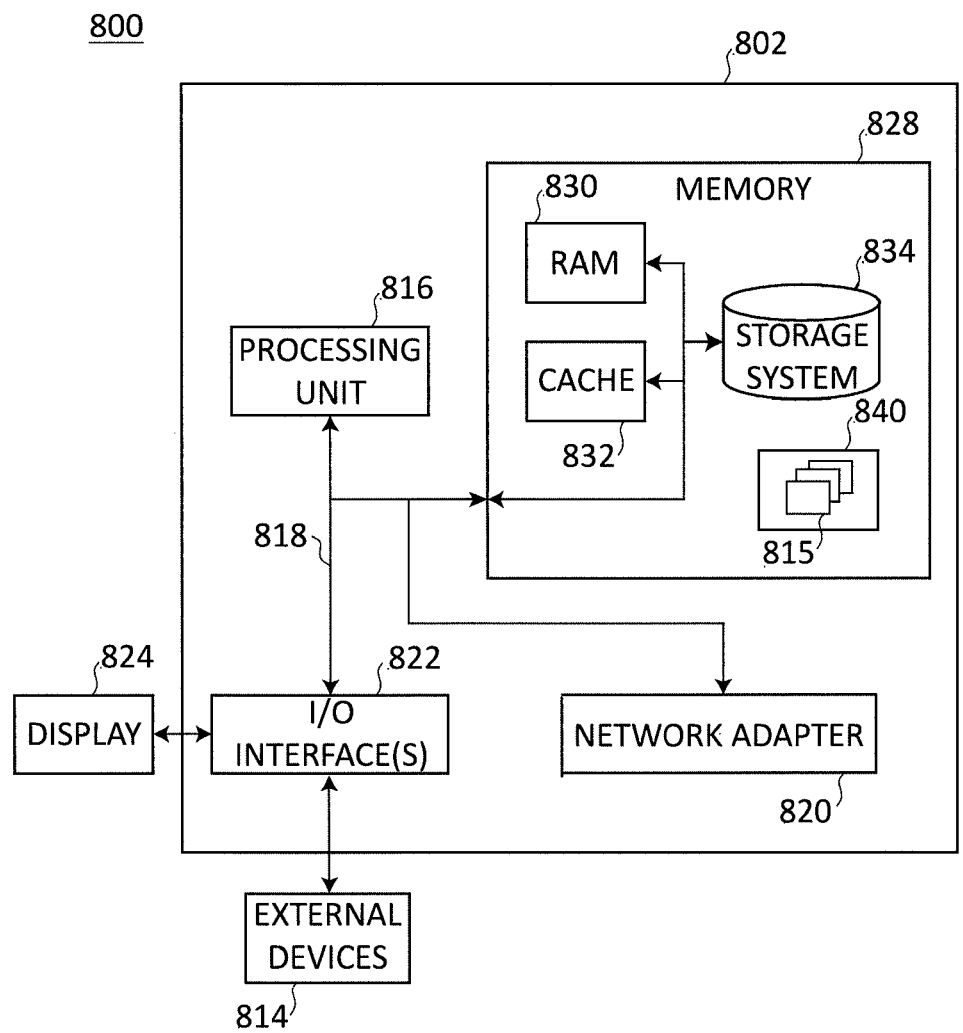
FIG. 8 is a schematic block diagram of a processor system of an example node of the mesh network, in accordance with an illustrative embodiment of the present disclosure.

Computer system 802 is shown in FIG. 8 in the form of a general-purpose computing device. The components of computer system 802 may include, but are not limited to, one or more processors or processing units 816, a system memory 828, and a bus 818 that couples various system components including system memory 828 to processor 816.

Computer system 802 typically includes a variety of computer system readable media. Such media may be any available media that is accessible by the processing system of a node 101, and it includes both volatile and non-volatile media, removable and non-removable media.

System memory 828 can include computer system readable media in the form of volatile memory, such as random access memory (RAM) 830 and/or cache memory 832. Computer system 802 may further include other removable/non-removable, volatile/non-volatile computer system storage media. By way of example only, storage system 834 can be provided for reading from and writing to a non-removable, non-volatile magnetic media. In such instances, each can be connected to bus 818 by one or more data media interfaces. As will be further depicted and described below, memory 828 may include at least one program product having a set (e.g., at least one) of program modules that are configured to carry out the functions of embodiments of the disclosure.

Program/utility 840, having a set (at least one) of program modules 815 may be stored in memory 828 by way of example, and not limitation, as well as an operating system, one or more application programs, other program modules, and program data. Each of the operating system, one or more application programs, other program modules, and program data or some combination thereof, may include an implementation of communicating with a mesh networking environment. Program modules 815 generally carry out the functions and/or methodologies of embodiments of the disclosure as described herein.

Computer system 802 may also communicate with one or more external computing devices 814, e.g., a mobile device. Such communication can occur via an I/O interface 822, such as a Bluetooth interface. Still yet, computer system 802 can communicate with one or more networks such as a local area network (LAN), a general wide area network (WAN), and/or a public network (e.g., the Internet) via network adapter 820. As depicted, network adapter 820 and I/O interface 822 can communicate with the other components of computer system 802 via bus 818. It should be understood that although not shown, other hardware and/or software components could be used in conjunction with computer system 802. The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed methods include automatic configuration of the mesh network when a mesh or router node is added, removed, fails, or moves. The mesh nodes can automatically send upstream messages to the head node, such as hotel locks sending a status messages reporting battery life status. The head node can broadcast messages to the hotel locks or to individual hotel locks using minimal and easily reconfigurable routing information. The head node can determine and send routing suggestions to a source node when the source node wants to send a message downstream to a destination node. Thus, hotel locks can communicate with one another by obtaining routing information provided by the head node 104. The methods described below, offer simplicity of operation of the mesh network, versatility, and conservation of power expended by the nodes, e.g., hotel locks, thus preserving battery life.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of routing communication between nodes of at least one network including a mesh network, the method comprising:
    each node of the mesh network advertising a hop distance relative to a head node of the mesh network, the hop distance being a measure of how many hops the node is from the head node, the head node having a hop distance of zero;
    each subscriber node of at least one subscriber node of the mesh network transmitting via an upstream route to the head node a request to subscribe to a topic of a plurality of possible topics, the upstream route being determined based on the hop distance advertised by first routing nodes included in the upstream route, each first routing node recording routing information that identifies the first routing node's adjacent downstream first routing node; and
    the respective subscriber nodes subscribing to the corresponding topic for which it transmitted a request to subscribe, wherein subscribing to the corresponding topic provides the respective subscriber nodes with the ability to access contents of a published message associated with the corresponding topic.

2. The method of claim 1, wherein the method further comprises:
    transmitting a published message associated with a first topic along at least one downstream route, each having at least one second routing node and extending from the head node to a subscriber node of the at least one subscriber node that subscribes to the first topic, a first downstream route of the at least one downstream route being determined based on the routing information recorded by the first routing nodes of a first upstream route via which a first request to subscribe to the first topic was transmitted.

3. The method of claim 1, wherein the routing information recorded by the respective first routing nodes of the first upstream route includes at least one of downstream routing information and upstream routing information, the downstream routing information including an ID and/or physical address of a node from which the first routing node received the first request and an ID of the first topic, the upstream routing information including an ID and/or physical address of a node to which the first routing node passed the first request to subscribe and an ID of the first topic.

4. The method of claim 3, wherein the downstream routing information includes an ID and/or physical address of a single downstream node of the at least one routing node and the upstream routing information includes an ID and/or physical address of a single upstream node of the at least one routing node.

5. The method of claim 3, wherein a first subscriber node of the at least one subscriber nodes subscribes to the first topic, and the head node receives a second request to publish a message associated with the first topic, the method further comprising:
    passing the message from the head node along a first downstream route to the first subscriber node, the first downstream route being a reverse route of the first upstream route and including the first routing nodes, wherein respective first routing nodes are determined for the first downstream route by the corresponding adjacent upstream first routing node of the first downstream route based on at least one of the downstream and upstream routing information recorded by the adjacent upstream first routing node; and
    publishing the message to the first subscriber node.

6. The method of claim 5, wherein when submitting the first request to subscribe to the first topic, the first subscriber node records self-subscriber information that identifies the first subscriber node as subscribing to the first topic, the first subscriber node is recognized as subscribing to the first topic based on the recorded self-subscriber information, and publishing the message to the first subscriber node includes recognizing that the first subscriber node subscribes to the first topic.

7. The method of claim 5, wherein when passing the message from the head node along the downstream route toward the first subscriber node, if it is determined that passing the message from a first downstream node to a second downstream node of the nodes of the downstream route is a failure, wherein the method further comprises:
    passing from the first downstream node a third request to publish a second message associated with a failed route topic, the second message further identifying the second downstream node as a failed node;
    publishing the second message associated with the failed route topic to the nodes of the mesh network that subscribe to the failed route topic;
    determining to be orphaned topics each topic identified in instances of upstream and downstream routing information recorded by the first downstream node that include the ID or address of the failed node;
    removing each of the instances of the upstream and downstream routing information recorded by the first downstream node that include the ID or address of the failed node;
    for each node of the upstream route from the first downstream node to the head node, transmitting an unsubscribe message to the adjacent upstream node instructing the adjacent upstream node to unsubscribe from each of the orphaned topics; and
    unsubscribing from each of the orphaned topics by the node that received the unsubscribe message, wherein unsubscribing from each of the orphaned topics includes removing each of the instances of the upstream and downstream routing information that identify any of the orphaned topics recorded by the node that received the unsubscribe message.

8. The method of claim 3, wherein at least one of the upstream routing information and the downstream routing information is deleted after a predetermined time-to-live relative to a predetermined event.

9. The method of claim 1, wherein the first routing nodes are selected by respective adjacent downstream first routing nodes when passing the subscription request along the first upstream route based on being upstream from and within a distance capable of point-point communication with the corresponding adjacent downstream first routing node, an upstream direction being determined based on the hop distances advertised by the nodes.

10. The method of claim 1, wherein the method further comprises:
    submitting by a first node of the mesh network a second request to publish a message associated with the first topic; and
    passing the second request to publish the message along a second upstream route of second routing nodes of the mesh network from the first node to the head node, wherein the second routing nodes are selected by respective adjacent downstream second routings node when passing the second request along the second upstream route based on being upstream from and within a distance capable of point-point communication with the corresponding adjacent downstream second routing node, an upstream direction being determined based on the hop distances advertised by the nodes.

11. The method of claim 10, wherein when passing the second request to publish the message along the second upstream route to one of the second routing nodes is unsuccessful, the method further comprising:
selecting an alternative second routing node instead of the second routing node, the alternative second routing node being selected based on the hop distance advertised by the alternative second routing node; and
passing a third request to publish a second message associated with a failed route topic, the second message further identifying the second routing node.

12. The method of claim 11, wherein the method further comprises:
publishing the second message associated with the failed route topic to the nodes of the mesh network that subscribe to the failed route topic; and
if it is determined by a node to which the second message was published that either of its recorded upstream or downstream routing information includes the second routing node, then replacing the second routing node in its recorded upstream or downstream routing information with a different node.

13. The method of claim 1, wherein the method further comprises receiving by a node of the mesh network a configuration, the configuration including at least one of a topic to which the node is configured to subscribe and a topic for which the node is configured to publish.

14. The method of claim 13, wherein the node receives a first configuration from a programming device, the configuration including only a first topic to which the node is configured to publish and only a second topic for which the node is configured to subscribe, wherein the head node subscribes to the first topic and publishes for the second topic, the method further comprising:
submitting by the node a publish request to publish a first message associated with the first topic as a request for additional configuration;
the head node receiving the publish request and publishing the first message to itself;
the head node publishing a second message associated with the second topic to the node with configuration data; and
the node receiving the second message and using the configuration data to further configure the node.

15. The method of claim 13, wherein the node is configured to publish on a first topic and the head is configured to subscribe to the first topic, the method further comprising:
the node submits a second request to publish a first message on the first topic, the first message reporting a status of the node;
the head node receives the second request to publish the first message;
the head node publishes the first message to itself; and
the head node tracks the status of the node based on receipt of the first message over time.

16. The method of claim 1, wherein the method further comprises:
receiving by an intermediary node from a device of a second network a second request to publish a second message associated with the first topic; and
the intermediary node sending the second request to publish the second message to the head node for publishing the second message to the nodes of the mesh network that subscribe to the first topic.

17. The method of claim 1, wherein the method further comprises:
receiving by an intermediary node from a device of a second network a second request to subscribe to a second topic;
receiving by the intermediary node from the head node a third request to publish a second message associated with the second topic; and
sending the second message by the intermediary node to the device.

18. A plurality of nodes of a mesh network, the plurality of nodes including at least one subscriber node, at least one router node, and a head node, each node of the plurality of nodes comprising:
a memory configured to store instructions;
a processor in communication with the memory, wherein the processor of respective nodes of the plurality of nodes, upon execution of the instructions is configured to:
advertise a hop distance relative to the head node, the hop distance being a measure of how many hops the node is from the head node, the head node having a hop distance of zero;
transmit via an upstream route to the head node a request to subscribe to a respective topic of a plurality of possible topics, the upstream route being determined based on the hop distance advertised by first routing nodes of the at least one routing node included in the upstream route, each first routing node recording routing information that identifies the first routing node's adjacent downstream first routing node; and
subscribe the respective subscribing nodes that submitted a request to subscribe to a topic to the corresponding topic, wherein subscribing to the corresponding topic provides the respective subscriber nodes with the ability to access contents of a published message associated with the corresponding topic.

19. The plurality of nodes of claim 18, wherein the processors of respective nodes of the plurality of nodes, upon execution of the instructions are configured to:
transmit a published message associated with a first topic along a downstream route having at least one second routing node and extending from the head node to a subscriber node of the at least one subscriber node that subscribes to the first topic, the downstream route being determined based on the routing information recorded by the first routing nodes of an upstream route via which a request to subscribe to the first topic was transmitted.

20. The plurality of nodes of claim 18, wherein a first subscriber node of the at least one subscriber nodes subscribes to the first topic, the head node receives a second request to publish a message associated with the first topic, and the processors of the respective nodes of the plurality of nodes, upon execution of the instructions are configured to:

pass the message from the head node along a first downstream route to the first subscriber node, the first downstream route being a reverse route of the first upstream route and including the first routing nodes, wherein respective first routing nodes are determined for the first downstream route by the corresponding adjacent upstream node of the first downstream route based on at least one of the downstream and upstream routing information recorded by the adjacent upstream node; and
publish the message to the first subscriber node.

* * * * *